C. Avery,
Horse Power,
Nº 19,976.   Patented Apr. 20, 1858.
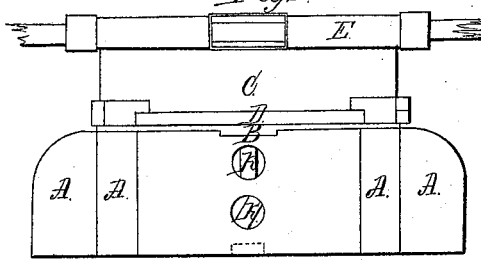
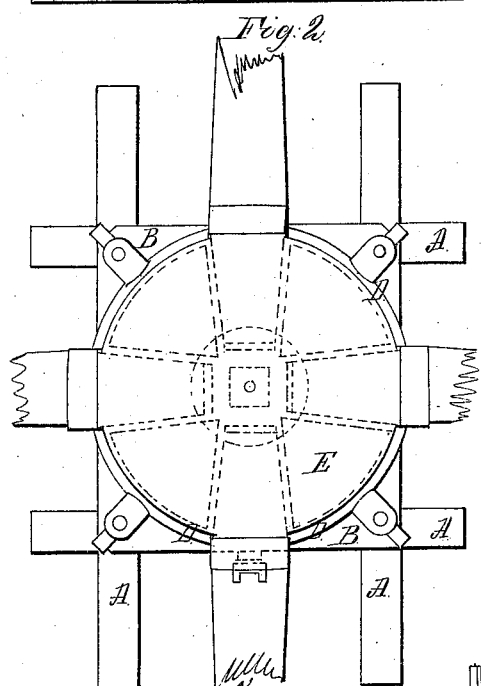
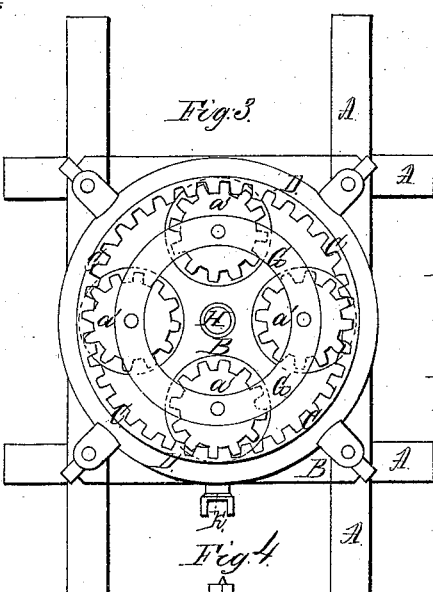
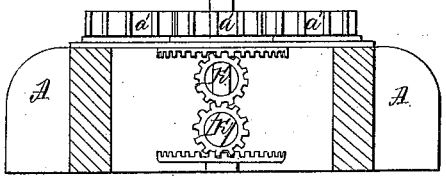
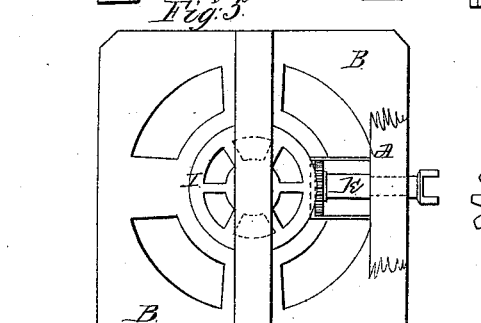
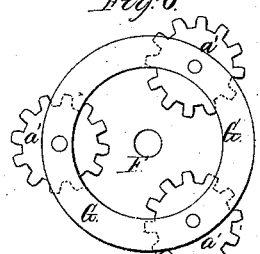
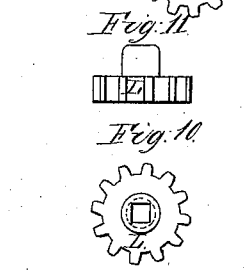

UNITED STATES PATENT OFFICE.

CYRUS AVERY, OF TUNKHANNOCK, PENNSYLVANIA.

GEARING FOR HORSE-POWER.

Specification of Letters Patent No. 19,976, dated April 20, 1858.

*To all whom it may concern:*

Be it known that I, CYRUS AVERY, of Tunkhannock, in the county of Wyoming and State of Pennsylvania, have invented a new and useful Improvement in Cog or Tooth Gearing for Horse-Power and other Purposes; and I do hereby declare that the following is a full and exact description thereof, reference being had to the accompanying drawings and to the letters of reference marked thereon.

The nature of my invention consists in the peculiar arrangement of the cog or tooth gearing; by which I am enabled, 1st, to produce the slowest motion and from that to the highest velocity ever required in machinery of this character; 2nd, overcoming lateral strain, each wheel being acted upon on opposite sides by the same amount of strain at all times while in motion; 3rd, lessening the amount of friction, and lastly in securing the gearing from dust and other obstructions while in motion.

To enable others skilled in the art to make and use my invention, I will describe its construction and operation for a horse-power.

The frame A, upon which the bed-plate rests, is formed of four pieces of plank from two to three inches thick and from ten to fourteen inches wide, and halved together edgewise.

B is the bed-plate, made of cast iron five eighths of an inch thick, about twenty inches square; and is secured to the frame A at the corners by the same bolts which hold the frame together.

C is the main wheel, of cast iron, about eighteen inches across at the pitch-line, and from eight to ten inches width of periphery; upon the inside of which are the cogs or teeth. This wheel may be made of one solid piece, with teeth extending from the upper edge to within an inch or two of the lower edge; or, it may be made in sections; each section having teeth of the same size and number with the others, or the teeth in one section may be heavy and strong while those in the others may be light and more numerous. There are four arms or horns projecting outward about two inches; four or five inches wide; at equal distances for the levers to rest upon. At the lower edge of the wheel is a flange turned outward; about half or three fourths of an inch wide.

D is a circle made in halves, with a gain or recess made to fit loosely above and around the flange of the main-wheel and is secured to the bed-plate and frame by means of the four bolts mentioned and is intended to keep the main wheel in place.

E is the top plate or cover of the main wheel with horns to correspond with those upon the main wheel and has upon the underside eight ribs running from the outside edges of the horns toward the center and are intended as supports to the levers—a plate or circle projecting over these ribs near the center and forming steps or sockets for the inner ends of the levers.

The top plate has projections between the horns, like those upon a surveyor's compass and when placed upon the main-wheel are coupled to it by means of square bands made to fit around the horns upon the wheel and its cover, thus holding the wheel and cover together and at the same time completing the sockets for the levers—the horn upon the wheel and that corresponding with it upon the cover being about two inches apart. At the center and upon the inside of the cover is a square recess about three inches in diameter to receive a square block of iron with an eye in the center, which fits to the square at the upper end of the main shaft; and is intended, when the inside wheels are removed, to connect the main wheel and center shaft so that both shall move together; thus producing the slowest motion to the driving shafts. At the center of the square recess above mentioned is a countersink to receive the pivot end of the main shaft, upon which pivot the main wheels usually turns and mainly rests.

$a'$ $a'$ $a'$ $a'$, are the lower, or first series of intermediate wheels, and have their lower bearings in the bed-plate B and their upper bearings in the annular ring G. These lower wheels are fastened to round plates with smooth edges or flanges, or cast solid with them projecting out beyond the ends of the cogs so as to come in contact with the inner surface of the main wheel, for the purpose of steadying the main wheel and keeping the teeth from gearing too deeply.

F is a round plate fitted loosely upon the center shaft, upon the underside of which a pinion is fastened, the teeth of which pinion take into the intermediate wheels $a'$ $a'$ $a'$ $a'$.

G is one of the annular rings (there being one or more, one for each series of intermediate wheels) and forms the bearings of the intermediate wheels (the upper bearings). There are grooves in the upper surface with holes near the axles of the wheels for conveying oil to the bearings.

b' b' b' are the pinions, which are fastened to the round plates F, with round holes in the center and working loosely upon the main or center shaft; the upper pinion is fitted closely to the top of the center shaft and gives motion to it.

H is the center shaft, (and is fitted to work freely in a thimble which is cast with or fastened to the bed plate) the lower end of which rests in a step below the bed plate.

I, I, are two bevel-wheels of the same size and fitted closely to the center shaft between the step and the bed-plate, and placed about ten or twelve inches apart, face to face.

K, K, are the two driving shafts running horizontally side by side, with universal joints at the outer ends and with bevel wheels and pinions near the other ends; and are to work between and gear into the bevel wheels I, I. These bevel pinions upon the driving shafts are connected with square gear pinions, one upon each shaft, which gear together and are fitted with projections or necks with smooth surface to prevent the teeth of the pinions from gearing too deeply.

L is an extra pinion fitted to the top of the main shaft and is to be used when medium velocity is desired. It may be fitted to a longer collar and then it will reach the lower series of wheels, thus producing still slower motion.

M is a square block of iron to connect the main wheels and main shaft together by which means the lowest velocity is produced.

The levers may be attached to the main wheels by any other means than those described and at any desired point below the top. The dimensions of the frame and of the several parts may vary in size and strength as may be desired. Friction rollers may be set in the anular rings of the several series of wheels instead of leaving them to have their bearings upon the hubs so friction rollers may be set in the play of the main wheel to keep it from rubbing on the bed plate.

I will now refer to the figures upon the drawings.

Figure 1, is a view of the entire machine on a level with the eye. Fig. 2 is a view looking perpendicular to the top. Fig. 3, is a view of the machine with the top removed. Fig. 4, shows a side of the frame with the wheels below the bed plate—one series of intermediate wheels and the upper end of the main shaft. Fig. 5, is a view of the underside of the machine. Fig. 6, shows one series of intermediate wheels. Fig. 7, is a side view of same with lower plate and pinion. Fig. 8 shows the upper pinion with two intermediate wheels and one of the annular rings. Fig. 9, is a side view of the same with a pinion. Fig. 10, is the upper, center pinion. Fig. 11, is the extra pinion with collar. Fig. 12, is the square block of iron fitted to the upper end of main shaft and recess, in the cover. Fig. 13, is a side view of same.

What I claim as my invention and desire to secure by Letters Patent is—

1. Forming the main wheels with a wide periphery, cast whole or in sections, so that any desired number of series of intermediate wheels may work within it; one series above another and each series to gear into the main wheel, thus enabling me, by slipping on, or slipping off one or more series of intermediate wheels, to produce very low, very high or medium velocity.

2. I claim the method by which the main wheel is kept in position, viz. by means of a thimble attached to the center of the bed plate, in connection with the flanges upon the lower intermediate wheels and by the flange upon the out side of the main wheel in connection with the circle around and above it; and by the pivot at the top of the main shaft.

3. I claim the method by which any desired velocity is obtained namely by removing or adding one or more series of intermediate wheels as described.

CYRUS AVERY.

Witnesses:
W. STANSBURY.
IRA AVERY.